United States Patent [19]

Drazan

[11] Patent Number: 4,571,148
[45] Date of Patent: Feb. 18, 1986

[54] MANIPULATING UNIT

[75] Inventor: Pavel J. Drazan, Cardiff, United Kingdom

[73] Assignee: National Research Development Corporation, London, England

[21] Appl. No.: 551,998

[22] PCT Filed: Mar. 14, 1983

[86] PCT No.: PCT/GB83/00075
§ 371 Date: Oct. 25, 1983
§ 102(e) Date: Oct. 25, 1983

[87] PCT Pub. No.: WO83/03217
PCT Pub. Date: Sep. 29, 1983

[30] Foreign Application Priority Data

Mar. 15, 1982 [GB] United Kingdom ............... 8207517

[51] Int. Cl.$^4$ ........................... B66C 1/00; B25J 11/00
[52] U.S. Cl. ................................. 414/730; 901/45; 29/714; 33/185 R
[58] Field of Search ............ 901/45; 414/730; 33/174 L, 189, 191, 174 O, 185 R, 169 C, 172 D; 29/714

[56] References Cited

U.S. PATENT DOCUMENTS 3,824,674 7/1974 Inoyama et al. ................. 29/714 X
3,893,217 7/1975 Edmond .
3,963,271 7/1976 Sugino et al. .................... 901/45 X
4,048,687 9/1977 Kato et al. ........................ 29/714 X
4,098,001 7/1978 Watson ............................ 901/45 X
4,398,350 8/1983 Inoue ............................ 33/172 D X

FOREIGN PATENT DOCUMENTS 0015618 9/1980 European Pat. Off. .
0067882 12/1982 European Pat. Off. .
1284339 9/1972 United Kingdom .
2022550 12/1979 United Kingdom .

OTHER PUBLICATIONS

An Anatomy of Industrial Robots and Their Controls, Luh, IEEE Transactions on Automatic Control, vol. AC28, No. 2, Feb. 1983.
Pneumatic Touch Sensor, Garrison and Wang, IBM Technical Disclosure Bulletin, vol. 16, No. 6, Nov. 1983.

Primary Examiner—Larry Jones
Attorney, Agent, or Firm—Merchant, Gould, Smith, Edell, Welter & Schmidt

[57] ABSTRACT

A manipulating unit is disclosed comprising a housing (5) in which there are (a) position sensing means (7, 2a, 2b, 2c, 2d, 3a, 3b, 3c, 3d) for sensing the position of a member in the housing, which member is coupled locally to gripping means, and (b) actuating means (4a, 4b, 4c, 4d) coupled to the sensing means and the member for producing movements of the member within the housing.

5 Claims, 8 Drawing Figures

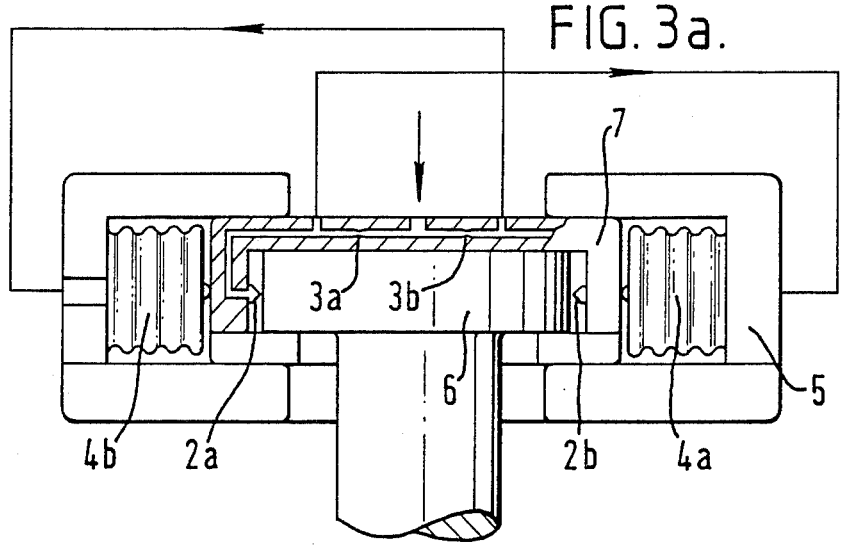
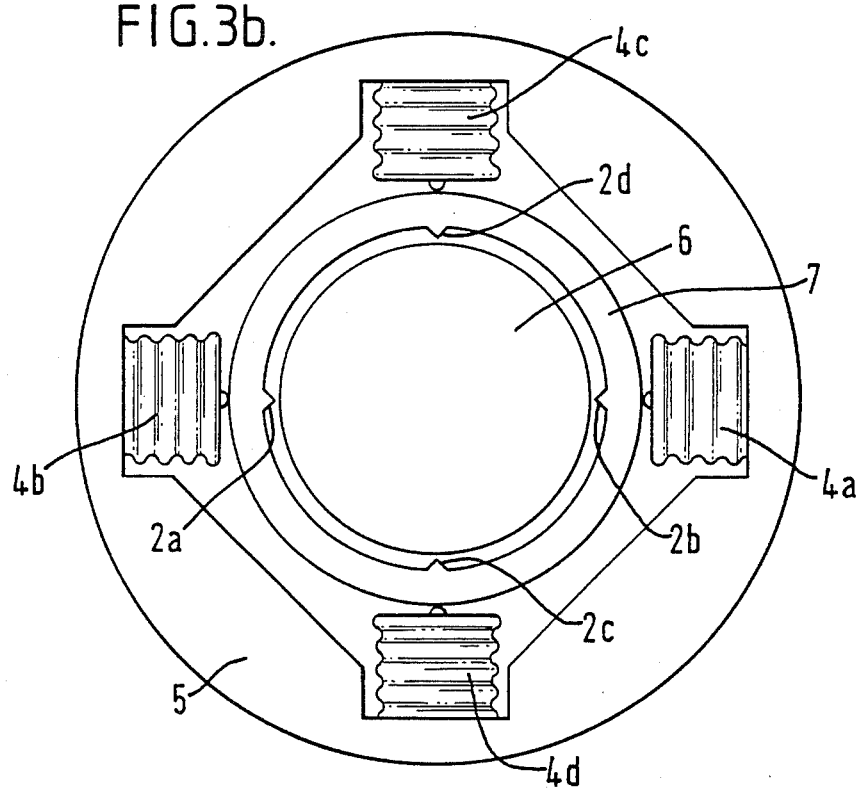

MANIPULATING UNIT

The present invention relates to a system for manipulating and holding an article, for example for use in an industrial robot or a co-ordinate table.

In manipulating systems comprising a robot arm and a robot gripper, there are known devices, called Remote Compliance Centres, which are placed between the robot arm and the robot gripper to provide the robot gripper with the compliance necessary to realise insertions of components in required locations. However, these devices are passive, i.e. they are provided with no sensing means to monitor the misalignments, nor with motors or other forms of actuators to realise the necessary adjustments.

High positioning accuracy is required in particular when robots are used for automatic assembly. Some work undertaken by research groups is attempting to sense the misalignment of components and correct it by adjusting the position of the robot arm.

Because robot arms are relatively heavy, it is difficult to make minute adjustments ranging from a few hundredths of millimeters up to a few millimeters.

According to the present invention, there is provided a system for holding and manipulating an article, the system comprising a housing in which there are: a member connected to means for holding the article; position sensing means for sensing the position of the member in the housing; and actuating means connected to the sensing means for producing movements of the member within the housing, wherein the position sensing means comprises: a sensor member having a nozzle; a first gas line with constricting means for supplying gas to the nozzle via the constricting means, the nozzle being disposed opposite the first member, whose position is to be sensed; and a second gas line, connected to the first gas line between the nozzle and said actuating means, the arrangement being such that, if the said first member moves towards or away from the nozzle, the gas pressure at the constricting means increases or decreases respectively, causing gas to flow towards or away from the actuating means via the second gas line to cause the actuating means to cause movement of the said first member. The actuating means may comprise bellows, or a pliable capsule, connected to the second gas line to allow the passage of gas into and out of the bellows or capsule, and which abuts the sensor members to cause movement thereof and thereby movement of the said first member.

The examples of the present invention to be described with reference to the accompanying drawings each comprises a system which is capable of both a sensing and an actuating function. the system is mounted at the end of the robot arm and provides the base for the robot hand (gripper). The system itself realises the corrective movement without resorting to using the arm's actuators. Because much smaller weights are manipulated than in the case of adjusting the whole robot arm, it is easier to realise minute adjustments required for the alignment of a component held by the robot hand.

In the system described below, misalignment of components between an inner member comprising such a first member and a sensor member of the sensing means is sensed, whilst the correction action is generated between an outer member comprising such a housing and the sensor member. The sensor member therefore acts as a mediator between the inner and outer members.

The present invention will now be described, by way of example, with reference to the accompanying drawings, in which:

FIGS. 3a and 3b are respectively a partially cut-away side view and a plan view of an example of the invention for compensating for types of misalignments according to FIG. 2;

Figure 1:
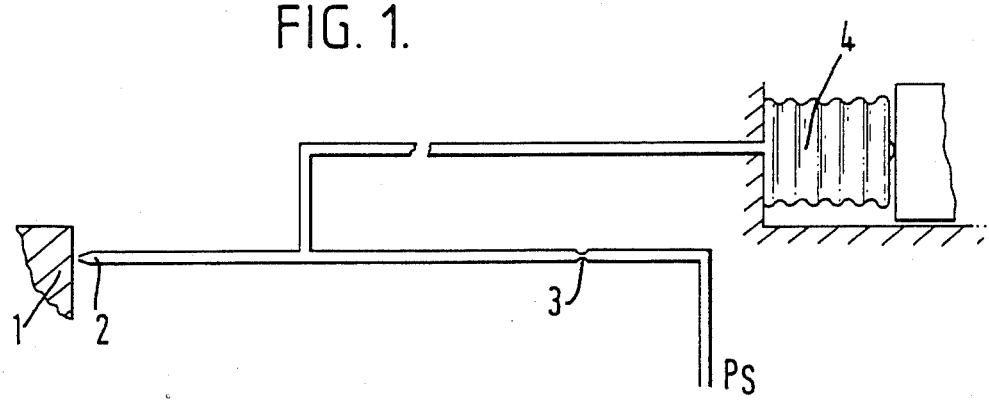
FIG. 1 is a diagram for explaining the principle of examples of the invention.

The examples of the present invention shown in FIGS. 3a, 3b, 5 and 6 use the principle of a 'back pressure sensor' in conjunction with a pneumatic actuator—see FIG. 1. The position of a component is monitored by a face 1. A nozzle 2 is supplied with air from a constant supply at pressure Ps via a constriction 3. When the fact 1 moves closer to the nozzle 2, the pressure in the conduit downstream of the constriction 3 is increased and consequently causes expansion of a bellows 4 providing an actuator.

Several sensor-actuator units based on the above principle can be combined together to cater for both linear and angular adjustments in more than one direction.

Figure 2:
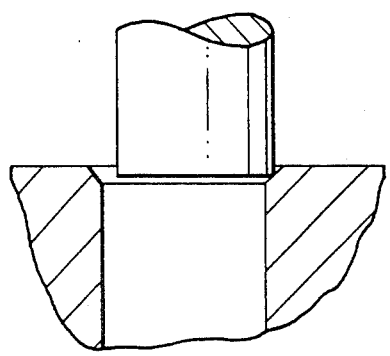
FIGS. 2 and 4 show different kinds of misalignment which can be compensated for by different examples of the invention.

In the case of the insertion of a pin into a hole, a possible misalignment which may occur is shown in FIG. 2. The misalignment where the pin makes a contact with the chamfer of the hole may be cured by the type of unit shown in FIGS. 3a and 3b. In the unit of FIGS. 3a and 3b, an outer member 5 is mounted on the robot arm whilst an inner member 6 provides a base for the robot hand (gripper). The member 6 can slide freely in a horizontal plane inside a sensor member 7 which in turn may be moved in any horizontal direction by two pair of bellows 4a, 4b and 4c, and 4d mounted inside the outer member 5. If, for example, the pin, when being pushed by the gripper into the hole, makes a first contact with the right-hand side of the chamber, the member 6 would tend to slide the left and close a nozzle 2a which in turn would cause an increase of pressure in the right-hand bellows 4a. At the same time, the inner member 6 would open a nozzle 2b connected to the left-hand bellows 4b thus reducing its pressure. As a result of this, the sensor member 7 would be moved by the pair of bellows 4a, 4b to the left, carrying the inner member 6 and thus correcting the misalignment of the pin. The movement of the member 6 inside the sensor member 7 is only a few tenths of a millimeter, whilst the movement of the sensor member 7 inside the outer member 5 is much larger, of the order of a few millimeters. Similarly, another pair of sensing nozzles 2c, 2d and the pair of bellows 4c, 4d can realise adjustment in the perpendicular direction. Thus, misalignments in any direction in the plane of the unit can be catered for.

Figure 4:
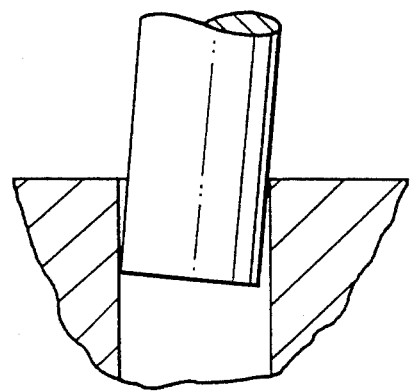
Figure 5:
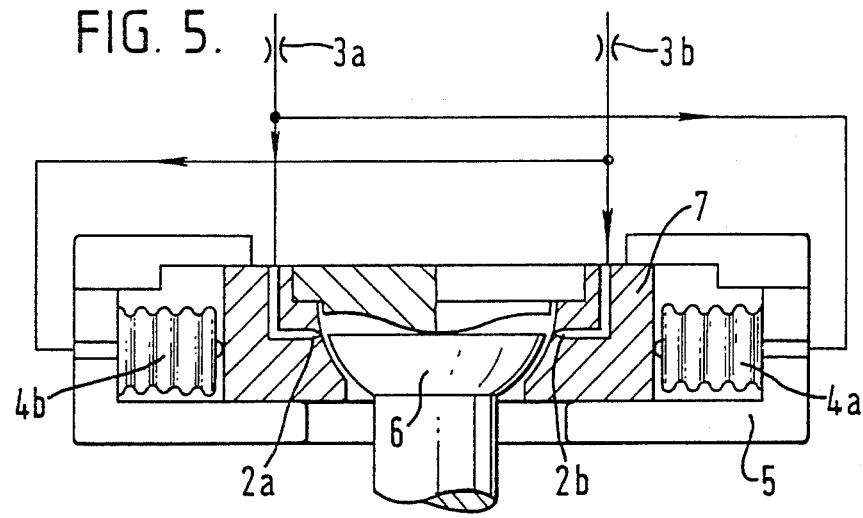
FIG. 5 is a partially cut-away side view of an example of the invention for compensating for types of misalignments according to FIG. 4.

Angular misalignment (FIG. 4) may be corrected by a unit shown in FIG. 5. The inner member 6 is in this case a part which is in the form of a partspherical joint which can rotate, within a limited angle, in the sensor member 7. The sensing nozzles 2a, 2b monitor any deviation from a vertical position. For example, if the inclination of the pin is in the clockwise direction from vertical, the nozzle 2a at the left would close, thus increasing the pressure in the conduit which is connected to the bellows 4a on the right; simultaneously, the nozzle 2b would open, thus reducing the pressure in the bellows 4b on the left. Consequently, the bellows 4a would expand, pushing the member 6 to the left thus reducing and eventually eliminating the inclination. Again, another pair of sensing nozzles and another pair of bellows realise adjustments relative to a perpendicular axis.

Figure 6:
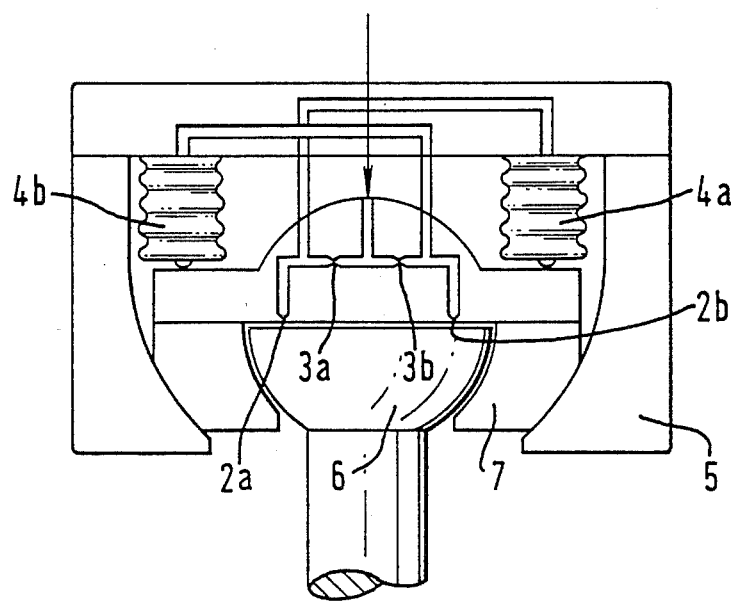
FIG. 6 is a side view of another example of the invention for compensating for types of misalignments according to FIG. 4.

A correction of angular misalignments can also be made by the unit shown in FIG. 6 where, instead of making adjustments (by the bellows) in a horizontal plane as previously, they would be realised by rotating the member 6 inside the outer member 5. In this case, all the relative movements between the members would be rotational instead of, as previously, some or all of them being linear. Again, another pair of sensing nozzles and another pair of bellows realise adjustments about a perpendicular axis.

It should be understood that in each of the above-described examples, the unit has two degrees of freedom, containing two pairs of sensing nozzles and two pairs of actuator-bellows, the pairs being arranged to form a cross to cater for alignments in two perpendicular directions or around two perpendicular axes.

It is possible to use three sensing nozzles and three bellows only, in each case offset by 120° relative to each other, to realise either planar or angular alignment.

It may be necessary in some cases to use up to four degrees of freedom to provide total freedom for adjustments. In such a case, a unit according to FIGS. 3a and 3b and a unit according to FIG. 6 could be mounted on each other, the inner member of one unit being fixed to the outer member of the other unit, thus providing two linear and two rotational adjustments.

Figure 7:
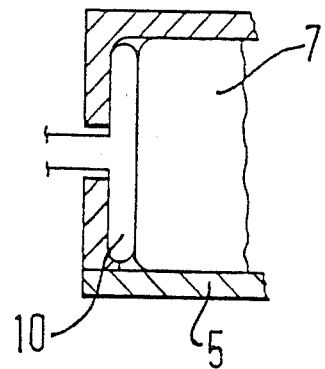
FIG. 7 shows an alternative embodiment of the actuating means.

As it is advantageous that the above manipulating units are as compact and as small as possible, the bellows, which may take up a relatively large space can be replaced by capsules moulded from a pliable material such as, for example, synthetic rubber. In all other respects, the configuration of the unit will remain the same. FIG. 7 shows such a capsule 10 moulded inside the outer member 5 in order to actuate the sensor member 7. The expanding side of the capsule can move the base of the robot hand in order to make the necessary adjustments.

I claim:

1. A system for holding and manipulating an article, the system comprising a housing in which there are: a member connected to means for holding the article; position sensing means for sensing the position of the member in the housing; and actuating means connected to the sensing means for producing movements of the member within the housing, wherein the position sensing means comprises: a sensor member having a nozzle; a first gas line with constricting means for supplying gas to the nozzle via the constricting means, the nozzle being disposed opposite the first member, whose position is to be sensed; and a second gas line, connected to the first gas line between the nozzle and said actuating means, the arrangement being such that, if the said first member moves towards or away from the nozzle, the gas pressure at the constricting means increases or decreases respectively, causing gas to flow towards or away from the actuating means via the second gas line to cause the actuating means to cause movement of the said first member.

2. A system as claimed in claim 1, wherein the actuating means comprises bellows connected to the second gas line to allow the passage of gas into and out of the bellows, and which abuts the sensor member to cause movement thereof and thereby movement of the said first member.

3. A system as claimed in claim 1, wherein the actuating means comprises a pliable capsule which is connected to the gas line to allow the passage of gas into and out of the capsule and which abuts the sensor member to cause movement thereof and thereby movement of said first member.

4. A system as claimed in claim 3, wherein the capsule is made of synthetic rubber.

5. A system according to claim 1, wherein the said housing comprises an outer member, and the said first member comprises an inner member inside the sensor member.

* * * * *